US012403432B1

(12) United States Patent
Hedrich

(10) Patent No.: US 12,403,432 B1
(45) Date of Patent: Sep. 2, 2025

(54) SHAKER FOR AEROSOL SPRAY CANS

(71) Applicant: Jeffrey A. Hedrich, Naples, FL (US)

(72) Inventor: Jeffrey A. Hedrich, Naples, FL (US)

( * ) Notice: Subject to any disclaimer, the term of this patent is extended or adjusted under 35 U.S.C. 154(b) by 893 days.

(21) Appl. No.: 17/505,936

(22) Filed: Oct. 20, 2021

(51) Int. Cl.
*B01F 31/20* (2022.01)
*B01F 35/42* (2022.01)

(52) U.S. Cl.
CPC .......... *B01F 31/201* (2022.01); *B01F 35/422* (2022.01)

(58) Field of Classification Search
CPC ....... B01F 31/201; B01F 31/24; B01F 35/422
See application file for complete search history.

(56) References Cited

U.S. PATENT DOCUMENTS 502,628 A * 8/1893 Ludlow .................. B01F 31/24 366/212
1,242,218 A * 10/1917 McCann ................ B01F 31/24 366/212
1,413,651 A * 4/1922 Burnett .................... A61C 5/68 366/602
2,022,527 A * 11/1935 Schletz ................ B01F 31/201 366/605
3,735,964 A * 5/1973 Lorenzen ............... B01F 35/42 366/211
4,420,262 A 12/1983 Sterrenberg
4,842,415 A * 6/1989 Cane .................... B01F 35/422 366/605
5,098,193 A 3/1992 Christensen
5,439,287 A 8/1995 Roepke, Sr.
5,897,205 A 4/1999 Sinsteden
6,435,705 B1 * 8/2002 Long .................... B01F 35/718 366/139
6,709,148 B2 3/2004 Glass
6,767,126 B2 7/2004 Miller
7,959,345 B2 6/2011 Benjamin, Ii
7,997,787 B2 8/2011 Blair
9,144,777 B2 9/2015 Brawley
9,649,653 B2 5/2017 Sanchez
10,220,359 B2 3/2019 Greene et al.
D913,067 S 3/2021 Dunn
2002/0101785 A1 * 8/2002 Edwards ............ B01F 25/4512 604/82
2003/0012082 A1 1/2003 Carter
2007/0145067 A1 * 6/2007 Headlee .............. B01F 35/7548 222/161

(Continued)

FOREIGN PATENT DOCUMENTS

EP 3513870 7/2019

OTHER PUBLICATIONS

English translation of EP 3513870A1, De Dijcker P., Jul. 24, 2019, obtained on Sep. 26, 2024 from <https://worldwide.espacenet.com/> (Year: 2024).*

*Primary Examiner* — Claire X Wang
*Assistant Examiner* — Patrick M Mccarty
(74) *Attorney, Agent, or Firm* — Bryan L. Loeffler, Esq.; LOEFFLER IP GROUP, P.A.

(57) ABSTRACT

A device for shaking aerosol spray cans (2) and spray paint containers that agitate and thoroughly mixes the contents contained therein by replicating the up-and-down and back-and-forth spinning motions an individual normally performs with his or her hand to shake a spray can. The spray can shaker (1) of the present invention is adaptable to multiple sizes and shapes and spray cans.

15 Claims, 7 Drawing Sheets

(56) References Cited

U.S. PATENT DOCUMENTS

| | | | | |
|---|---|---|---|---|
| 2011/0002766 | A1* | 1/2011 | Chen | B01F 31/10<br>414/732 |
| 2016/0121278 | A1* | 5/2016 | Hancock | B01F 31/24<br>366/215 |
| 2016/0175790 | A1* | 6/2016 | McCarley | B01F 31/24<br>366/211 |

* cited by examiner

SHAKER FOR AEROSOL SPRAY CANS

FIELD OF THE INVENTION

This invention relates to devices used to mix flowable liquids contained in pressurized aerosol canisters, and more particularly, a device for shaking a spray can to agitate and thoroughly mix the contents contained inside of the spray can

BACKGROUND OF THE INVENTION

A There are a plurality of spray products on the market that require shaking to ensure any liquids and propellant contained in the canister are well mixed prior to being sprayed out of a pushbutton or trigger activated nozzle. Many propellants used in aerosols aren't miscible in other liquids, thus, the liquids and propellants will form separate layers in the canister when stored. This may also happen with the ingredients of the liquid product itself. If not shaken prior to use, the canister will expel excess propellant, an uneven spray, and/or nothing at all.

Spray paint is perhaps the most well-known aerosol product that requires vigorous shaking prior to use to ensure the contents are properly mixed with each other prior to application. Failure to thoroughly shake a paint will cause an uneven finish when applying canisters A the paint. Shaking paint cans and other aerosol canisters can be difficult for individuals who suffer from dexterity issues, such as carpel tunnel disease. This is especially true of paint cans that have been stored for any extended periods of time.

Therefore, a need exists for a device for shaking spray paint cans and other spray cans to agitate and thoroughly mix the contents contained therein.

SUMMARY OF THE INVENTION

The primary object of the present invention is to provide a device for shaking paint cans and other spray cans to agitate and thoroughly mix the contents contained therein prior to application.

An additional object of the present invention is to provide a device for shaking paint cans and other aerosol containers that is adaptable to multiple sizes of spray cans.

An additional object of the present invention is to provide a device for shaking paint cans and other spray cans that is adaptable to aerosol canisters having different shapes.

The present invention fulfills the above and other objects by providing a spray can shaker having a carrier wherein a spray canister is secured in the shaker. The carrier is slidably attached to guides that are supported on opposing sides of the carrier by vertical supports and a stationary base having a non-slip bottom surface. A stationary handle may extend above the spray can shaker to provide a contact point for a user to hold the spray can shaker in a fixed position on a flat working surface.

A manual or motorized power supply is used to move the carrier and secured spray can in an oscillating forward and backward motion. A manual power supply is illustrated herein having a crank handle connected to a gear box and a flywheel with a counterweight that causes the carrier to replicate an up-and-down and turning motion an individual normally performs with his or her hand to mix a spray can.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
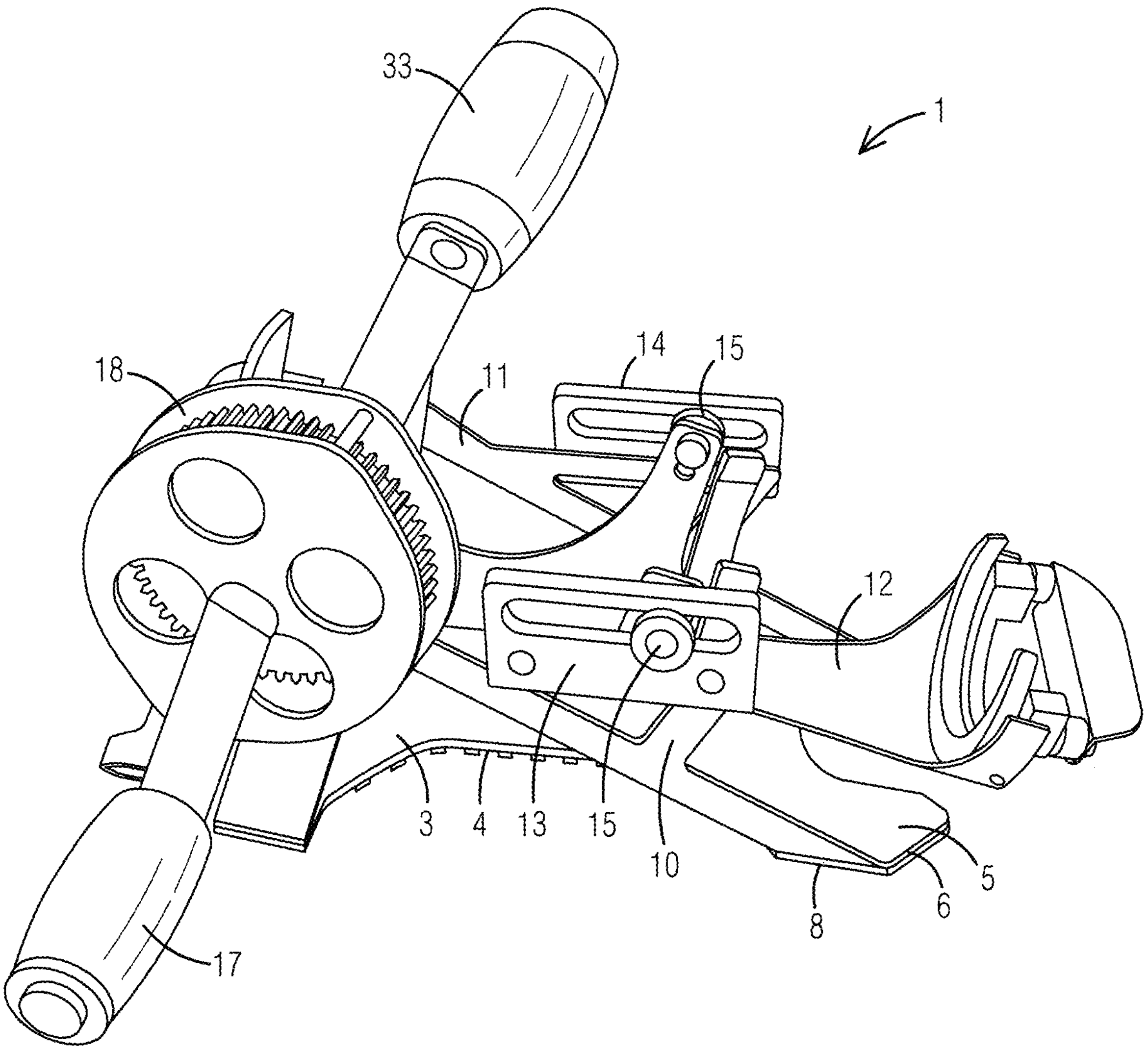
FIG. 1 is a top perspective view of an empty spray can shaker of the present invention.
Figure 2:
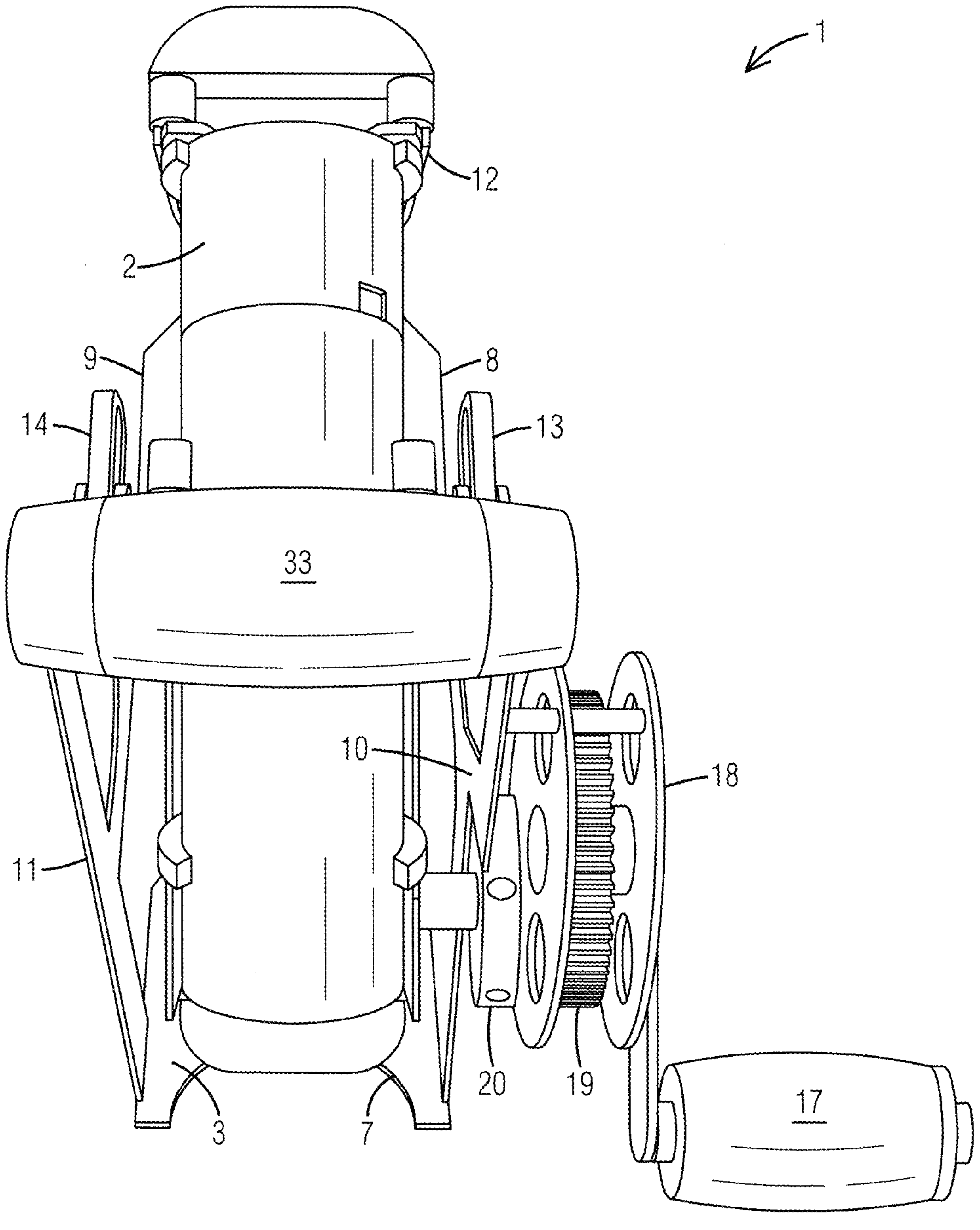
FIG. 2 is a top view of the spray can shaker of the present invention having a spray can secured therein.
Figure 3:
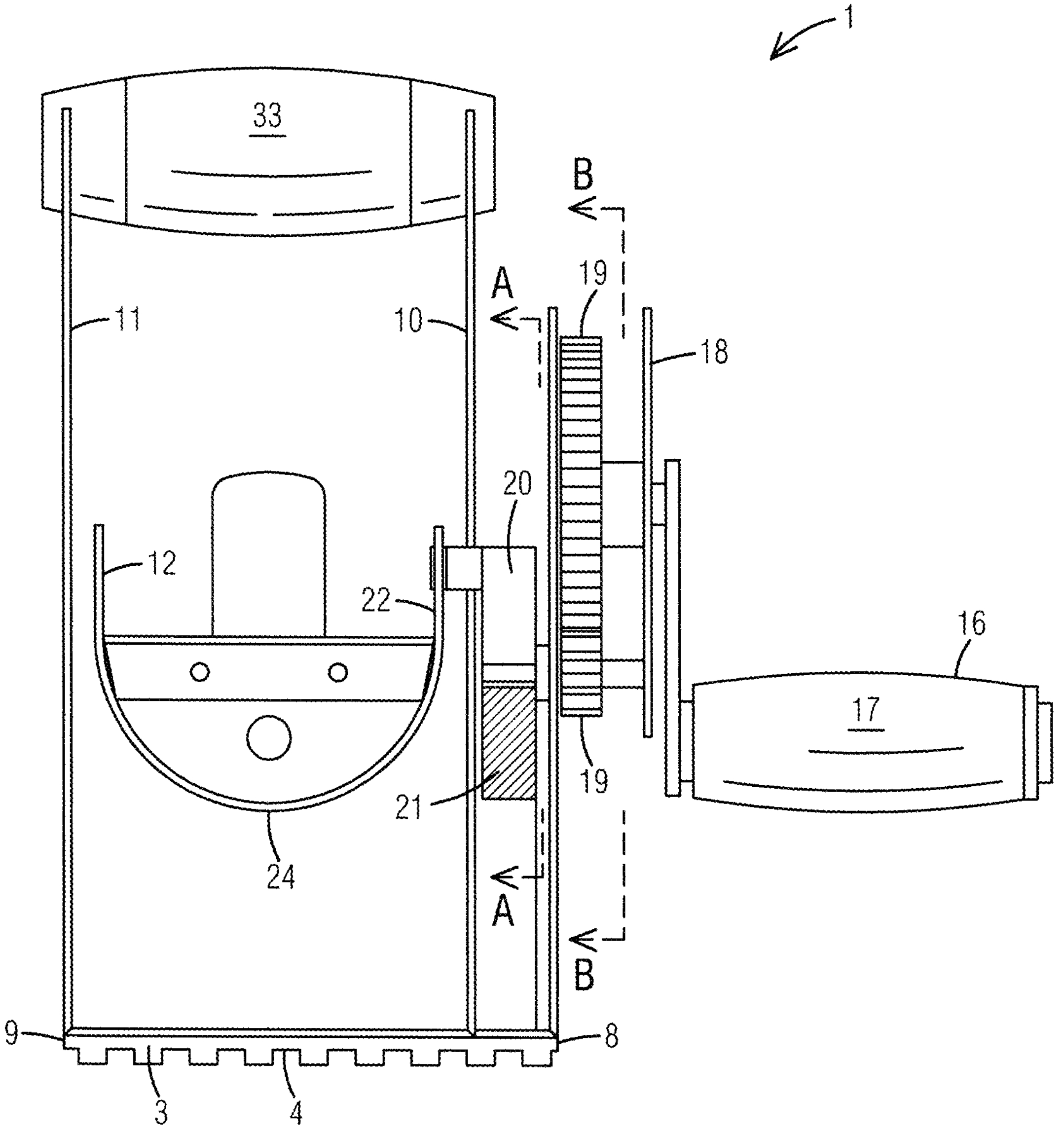
FIG. 3 is a rear view of the spray can shaker of the present invention.
Figure 4:
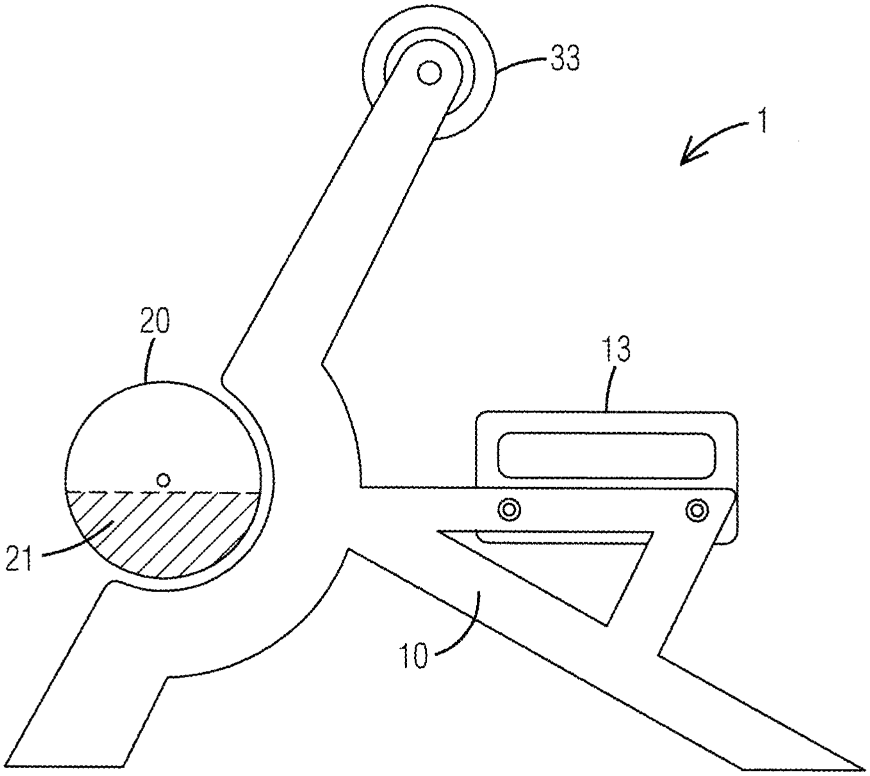
FIG. 4 is a sectional side view along lines A-A of FIG. 3 showing the flywheel and counterweight used to assist in actuating the carrier.
Figure 5:
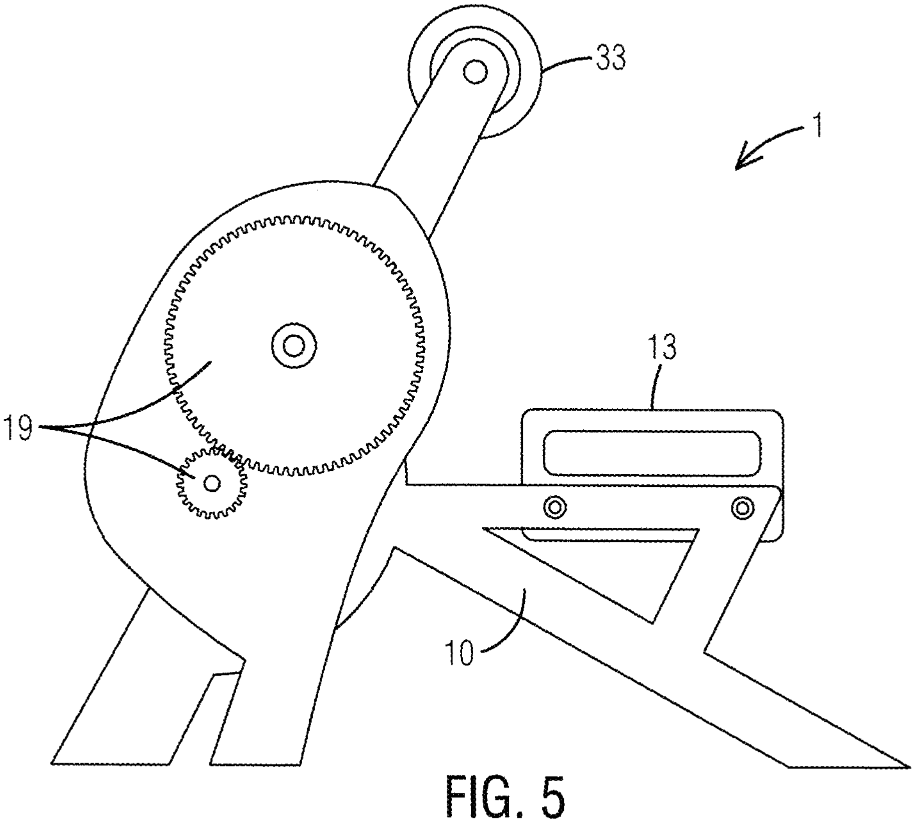
FIG. 5 is a sectional side view along lines B-B of FIG. 3 providing an internal view of the gear box used to assist in actuating the carrier.
Figure 6:
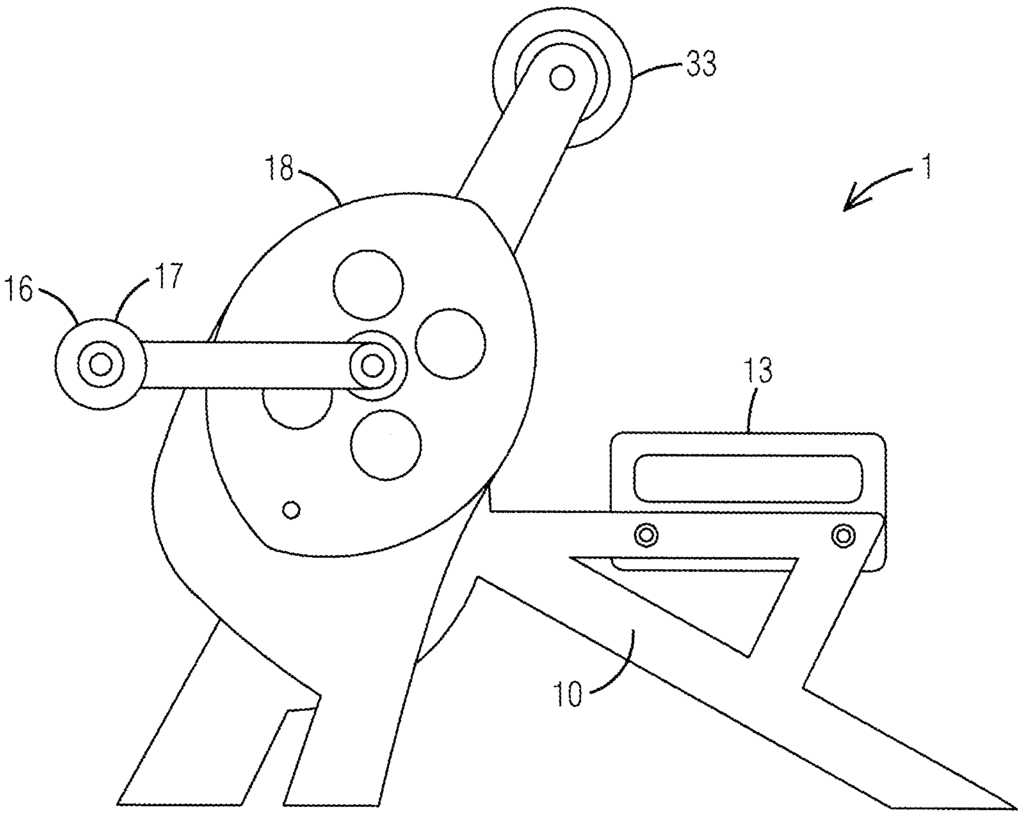
FIG. 6 is a right side view of the spray can shaker of the present invention.

For purposes of describing the preferred embodiment, the terminology used in reference to the numbered accessories in the drawings is as follows:

1. spray can shaker, generally
2. spray can
3. base
4. bottom surface of base
5. top surface of base
6. front edge of base
7. back edge of base
8. right side edge of base
9. left side edge of base
10. right vertical side support
11. left vertical side support
12. carrier
13. right side guide
14. left side guide
15. pin
16. power supply
17. crank handle
18. gear box
19. gear
20. fly wheel
21. counterweight
22. carrier body
23. front end of body
24. back end of body
25. inner surface of body
26. outer surface of body
27. clip, generally
28. top clip
29. bottom clip
30. middle clip
31. step
32. stop
33. stationary handle With reference to FIG. 1 and FIG. 2, views of a spray can shaker 1 of the present invention without a spray can 2 and with a spray can 2, respectively, are illustrated. The spray can shaker 1 comprises a base 3 having a planar bottom surface 4, top surface 5, front A edge 6, back edge 7, a right side edge 8, and a left side edge 9. A non-slip surface and or/means to mechanically mount the base 3 to a work surface is preferably located on the bottom surface 4 of the base 3 to keep the base stationary during use.

A right vertical side supports 10 and a left vertical support 11 each extend upward at an angle, respectively, from the right side edge 8 and a left side edge 9.

The right vertical side support 10 and the left vertical support 11 support a carrier 12 in an A elevated position above the base 3. The carrier 12 provides means for securing a spray can 2 in the spray can shaker 1. The carrier 12 is slidably attached to the right side vertical support 10 and the left vertical support 11 via a right side guide 13 and a left side guide 14, both of which preferably comprise fixed channels that engage pins 15 extending from a right side of the carrier 12 and a left side of the carrier 12.

A motorized or a manual power supply 16 may be used to move the carrier 12 and a spray can 2 secured therein in the carrier 12 in a front-to-back oscillating motion in relation to the base 3, thereby replicating an up-and-down and turning motion an individual normally performs with his or her hand to mix a spray can 2. A stationary handle 33 preferably extends above the spray can shaker 1 in a substantially centered position to provide a contact point for a user to hold the spray can shaker 1 a fixed position on a work surface.

With reference to FIGS. 3-6, the manual power supply 16 is illustrated herein having a crank handle 17 connected to a gear box 18 having at least two gears 19 housed therein to transfer the power from the rotating crank handle 17 to a flywheel 20 having a counterweight 21 located thereon that is pivotally attached to a back end 24 of the carrier 3 in a circular motion combined with a front-to-back motion in relation to the base 3, thereby replicating an up-and-down and turning motion an individual normally performs with his or her hand to mix a spray can 2.

Figure 7:
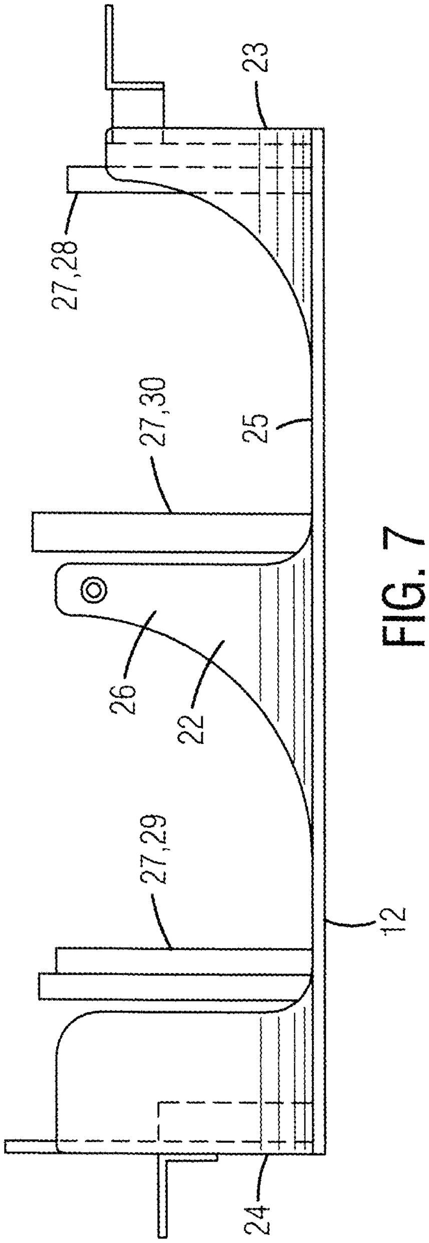
FIG. 7 is a side view of a carrier of the present invention.
Figure 8:
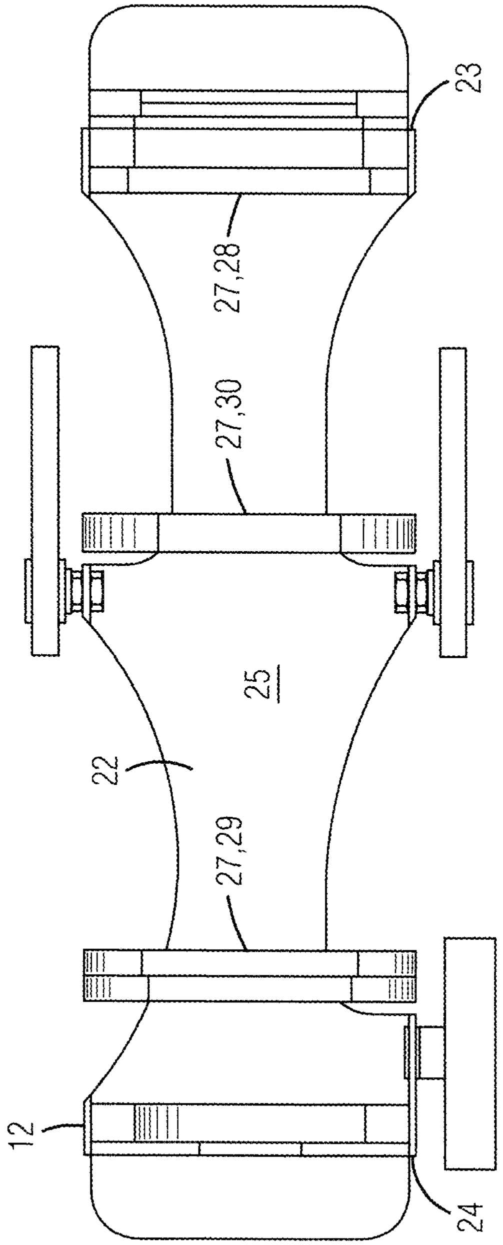
FIG. 8 is a top view of a carrier of the present invention.

With reference to FIGS. 7 and 8, a side view and a top view, respectively, of a carrier 12 of the present invention is illustrated. The carrier 12 comprises a preferably open tubular-shaped body 22 having a front end 23, a back end 24, an inner surface 25, and an outer surface 26. At least one C-shaped clip 27 is located within the tubular-shaped body 22 and is used to grasp and lock a spray can 2 into carrier the spray can shaker 1. As illustrated herein the carrier 12 comprises a top clip 28 located on the front end 23 of the body 22, a bottom clip 29 located on the back end 24 of the body 22, and at least one middle clip 30 located between the front end 23 of the body 22 and the back end 24 of the body 22.

Each clip 27 may act as an attachment means for securing a spray can 2 and may also act as ledges or stops so the carrier 12 may accommodate different sizes of spray cans 2. For example, when a full-sized spray can 2 may be inserted into the carrier 12, as illustrated in FIG. 2, it engages all of the clips 27 located in the carrier 12. When a short spray can 2 is inserted into the carrier 12, as illustrated in FIG. 9, it is not long enough to engage the bottom clip 29 and only engages the top clip 28 and two middle clips 30 with one of the middle clips 30 acting support for the bottom of the spray can 2.

Figure 9:
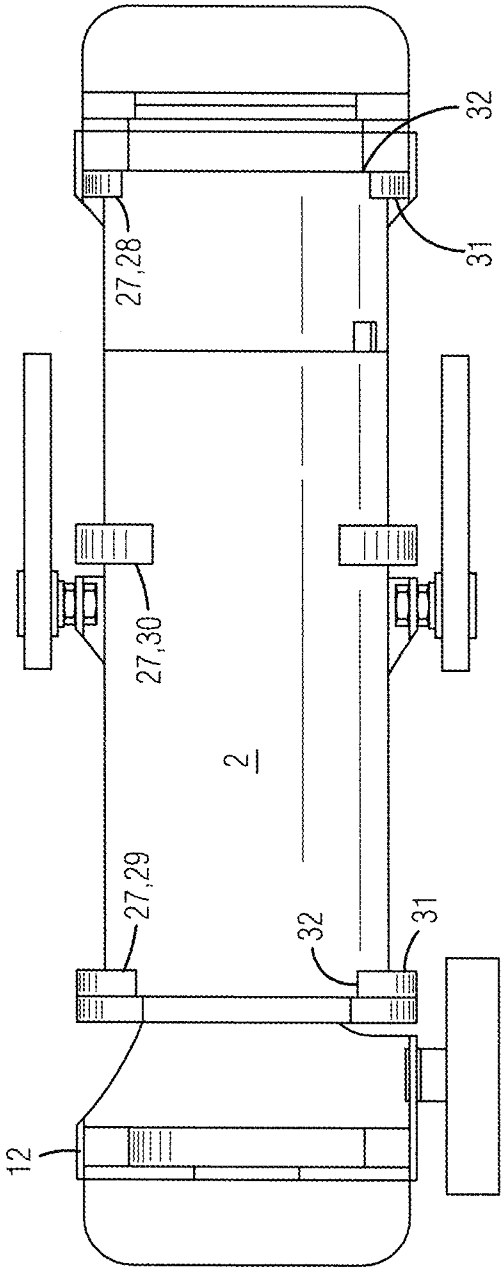
FIG. 9 is a top view of a carrier of the present invention accommodating a short spray can.
Figure 10:
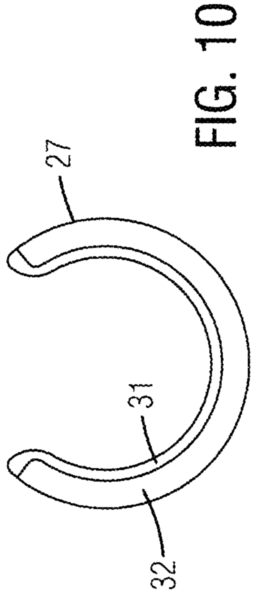
FIG. 10 is an end view of a C-shaped clip from the present invention.

As illustrated in FIG. 9, each clip 27 may comprise an indented step 31. Each indented step 31 may act as a stop 32 to engage top and bottom perimeter edges of a spray can 2. For example, as illustrated in FIG. 10, a step 31 located on a middle clip is engaging a bottom perimeter edge of the spray can 2 and acting as a stop 32 that keeps a top perimeter edge of the spray can 2 locked in secure contact with a step 31 located on the top clip 28.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A spray can shaker comprising:

a base having a bottom surface, top surface, front edge, back edge, a right side edge, and a left side edge;

a right vertical side support extending upward at an angle from the right side edge of the base;

a left vertical side support extending upward at an angle from the left side edge of the base;

said right vertical side support and left vertical side support supporting a carrier in an elevated position above the base;

said carrier providing a means for securing a spray can in the carrier;

said carrier being slidably attached to the right side vertical support by a first fixed channel on the base; wherein the first fixed channel is horizontal to the right side edge of the base;

said carrier being slidably attached to the left side vertical support by a second fixed channel on the base; wherein the second fixed channel is horizontal to the left side edge of the base; and a rotational power source connected to a first end of the carrier by at least one gear that rotates and causes the first end of the carrier to move up and down in relation to the base while simultaneously causing the carrier to move forward and backward in relation the first fixed channel on the base and the second fixed channel on the base.

2. The spray can shaker of claim 1 wherein: the carrier further includes a first projection located on a right side of the carrier that engages the first fixed channel; and a second projection located on a left side of the carrier that engages the second fixed channel.

3. The spray can shaker of claim 1 wherein:

said power source is pivotally connected to the first end of the carrier via the at least one gear and a fly wheel having a counterweight.

4. The spray can shaker of claim 1 wherein:

said power source is a crank handle.

5. The spray can shaker of claim 1 further comprising:

a stationary handle extending above the spray can shaker in a substantially centered position to provide a contact point for a user to hold the spray can shaker at a fixed position on a work surface.

6. The spray can shaker of claim 1 further comprising:

a non-slip surface located on the bottom surface of the base to keep the base stationary during use.

7. The spray can shaker of claim 1 wherein:

said carrier further comprises an open tubular-shaped body having a front end, a back end, and at least one middle clip located between the front end of the body and the back end of the body.

8. The spray can shaker of claim 7 wherein:

said at least one middle clip further comprises an indented step that acts as a stop to engage a perimeter edge of a spray can.

9. The spray can shaker of claim 1 wherein:

said carrier further comprises an open tubular-shaped body having a front end, a back end, an inner surface, and an outer surface; and at least one C-shaped clip located within the tubular-shaped body that is used to secure a spray can into the carrier.

10. The spray can shaker of claim 9 wherein:

said at least one C-shaped clip further comprises an indented step that acts as a stop to engage a perimeter edge of a spray can.

11. The spray can shaker of claim 9 wherein:

said carrier further comprises an open tubular-shaped body having a front end, a back end, and a top clip located on the front end of the body and a bottom clip located on the back end of the body.

12. The spray can shaker of claim 11 wherein:

said carrier further comprises at least one middle clip located between the front end of the body and the back end of the body.

13. The spray can shaker of claim 12 wherein:

said at least one middle clip further comprises an indented step that acts as a stop to engage a perimeter edge of a spray can.

14. The spray can shaker of claim 11 wherein:

said top clip further comprises an indented step that acts as a stop to engage a top perimeter edge of a spray can; and said bottom clip further comprises an indented step that acts as a stop to engage a bottom perimeter edge of a spray can.

15. The spray can shaker of claim 14 wherein:

said at least one C-shaped clip further comprises an indented step that acts as a stop to engage a perimeter edge of a spray can.

* * * * *